United States Patent [19]

Sitnichenko et al.

[11] 4,002,900
[45] Jan. 11, 1977

[54] PHOTOTRACING SYSTEM

[76] Inventors: Valentin Mikhailovich Sitnichenko, ulitsa Odesskaya, 58/6, kv. 14; Alexandr Mikhailovich Zamuruev, ulitsa Tereshkovoi, 12, kv. 24; Andrei Isakovich Kogut, ulitsa Pionerskaya, 20, kv. 12, all of Odessa, U.S.S.R.

[22] Filed: May 12, 1976

[21] Appl. No.: 686,226

Related U.S. Application Data

[63] Continuation-in-part of Ser. No. 254,467, May 18, 1972, and a continuation-in-part of Ser. No. 888,014, Dec. 24, 1969.

[52] U.S. Cl. .............................. 250/202; 318/577
[51] Int. Cl.² ..................................... H01J 39/12
[58] Field of Search ..................... 250/202; 318/577

[56] References Cited
UNITED STATES PATENTS 3,742,220   6/1973   Okuma ........................... 250/202

*Primary Examiner*—Alfred E. Smith
*Assistant Examiner*—T. N. Grigsby

[57] ABSTRACT

The phototracing system for controlling the motion of the work-performing member of a two-coordinate copying machine for pattern-cutting of sheet materials, wherein the tracing photo-head cooperates with a template drawing wherein the line being traced is represented as a "black" to "white" transition, by means of an optical scanning beam. The aperture of the optical beam in the plane of the template drawing has finite dimensions and is driven through a circular scanning motion at a permanent angular speed about the optical line of the tracing head.

The phototracing system includes a train head with a photoelectric transducer connected with two shapers of short pulses of the signal of the prefixed instantaneous change from "white" to "black" and from "black" to "white", respectively. The output of the second shaper of the short pulse of the prefixed instantaneous change from "black" to "white" has connected thereto means for delaying each pulse. The output of the said first pulse shaper and the output of the delay means are connected through a three way switch with the first inputs of two converters of the said signal of the prefixed instantaneous change of "black" and "white" and of the functional sinusoidal and cosinusoidal voltages into signals representative of the required velocity vectors of the motion of the tracing head along the "X and Y" axes. The outputs of these converters are connected with the inputs of two servomotors driving the tracing head along the X— and Y— axes and also with the inputs of two other servomotors moving the tool of the copying machine along similar axes.

1 Claim, 10 Drawing Figures

PHOTOTRACING SYSTEM

The present invention is a continuation-in-part of our co-pending Application, Ser. No. 888.014, filed on Dec. 24, 1969 and a continuation-in-part of application Ser. No. 254,467, filed May 18, 1972.

The present invention relates to the system of controlling two-coordinate machines and, more particularly, it relates to phototracing systems for controlling the tool of a two-coordinate machine for pattern-cutting of sheet material, adapted to trace one edge of a wide line by means of which there are represented on a template drawing the contours of parts that are to be cut at a preset scale from a sheet material by the tool of the machine, e,g. by the cutter of a coordinate machine for thermal cutting of sheet material; for instance, it relates to phototracing systems with circular scanning of the "black-to-white" transition of the wide line of a template drawing, the transition being traced in either one of two opposite predetermined directions.

There are widely known phototracing systems for controlling coordinate machines for thermal patter-cutting of sheet metal, operating by tracing in either one of the two opposite predetermined directions the edge of a wide contrast line of a template drawing.

The known photoracing systems operate with reflected light. The template drawing is made as a black line against a white background and is adequately illuminated in the tracing area.

To ensure a sufficient intensity of the light flux of the reflected optical beam, it is necessary that it should have an adequately great aperture or effective area in the plane of the template drawing.

In scale-adjusted control systems wherein the template drawing is considerably scaled down compared with the actual sizes of cutting, the diameter of this aperture, defined by the structural limitations of the tracing head, by distortion introduced by the optical elements, e.g. its inaccurate focusing, is not commensurated with the radius of the scanning orbit. This feature brings about the gradual character of the transition between "white" and "black" levels, which is the following signal of the traced edge of a line.

In such systems the change from "black" to "white" is evaluated by a fixed value of the level of the curve of this following signal, i.e. by the predetermined degree of transition of the aperture of the optical beam through the borderline between "black" and "white". The said instant of change between "black" and "white" in the abovespecified systems is determined by shaping short pulses from the curve of the readout signal, this being done separately for a change from "white" to "black" and for a change from "black" to "white", in accordance with the necessity of tracing the edge of a line in two opposite directions.

On account of varying reflection properties of the template drawing, of the varying brightness of illumination, of the varying response of the photoelectric pickup and for other reasons the level of "white" can have different values. This results in an error in determining the position of the edge of the line being traced, because the condition of shaping the abovesaid short pulses is met at different instantaneous positions of the aperture of the optical beam relative to the edge being followed.

This error is increased still further by the deformation of the "white" level of the following signal curve on account of various disturbances, e.g. those caused by pollution of the template drawing, by the non-uniformity of the zonal characteristics of the tracing head, etc.

An error in determining the edge of a line results in an error in following the line, in the path of the tracing head being displaced and distorted, as the line is being traced in the opposite directions. Such errors in tracing the lines of a template drawing involve errors in the dimensions of the parts being cut out from a sheet material, which becomes particularly pronounced when the reproduction scale is increased, i.e. when the dimensions of the parts being cut out are considerably greater than those of the template drawing.

It is an object of the present invention to increase the accuracy of tracing the edge of a contrast line of a template drawing in either one of two opposite predetermined directions.

The essence of the present invention resides in that in a phototracing system, comprising:

a tracing photo head including a photoelectric transducer and means for circular scanning of an optical beam about the optical line of the head, the beam having in the plane of a template drawing an aperture or effective area of a concentrated finite size, adapted to move along a circular scanning path about the centre of tracing, defined as the point of intersection by the optical line of the head of the plane of the template drawing, at a permanent angular speed, a first shaper of the short pulse of the readout signal, which is a signal of a prefixed instantaneous change from "white" to "black", a second shaper of a similar short pulse representing a similar change from "black" to "white", a three-way switch for electric connection of the output of either one of the first and second shapers, having a neutral midpoint position corresponding to a no-tracing signal, a source of a first functional cosinusoidal voltage and of a second functional sinusoidal voltage, the voltages being synchronous and cophasal with the angular scanning frequency of the optical beam of said tracing head, a first converter of the signal of the instant of change between "white" and "black", coming from the output of said three-way switch, and of the first functional cosionusoidal voltage of said source into a signal representative of the required velocity vector of the motion of the tracing head along the X—axis of coordinates, a second similar converter of the signal of the fixed instant of change between "white" and "black", coming from the output of said three-way switch, and of the second functional sinusoidal voltage of said source into a signal representative of the required velocity vector of the motion of the tracing head along the X—axis of coordinates, a first servodrive connected with said first converter and adapted to effect the motion of said tracing head along the X—axis:

a second servodrive connected with said second converter and adapted to effect the motion of said tracing head along the Y—axis in accordance with the present invention, the instant of the fixed instantaneous change from "white" to "black" is determined by the condition of the advance upon "black" of the greater part of the concentrated area of said aperture of the optical beam of the tracing head, whereas the instant of the prefixed instantaneous change from "black" to "white" is determined by the condition of the advance upon "white" of the smaller part of the area of the same aperture; the initial phase of said second functional sinusoidal voltage of said source being set by the coincidence in time of the first zeros of its sine wave with the short pulses at the output of said first shaper, provided that the edge of the line being traced passes through the centre of tracing, parallel with the X—axis.

Furthermore, the disclosed phototracing system includes means for delaying each one of the said short pulses generated by said second shaper by the time of the advance of the greater part of the concentrated area of said aperture from "black" upon "white" to the same degree, as that during the preceding advance thereof from "white" upon "black" which had initiated the generation of a short pulse at the output of said first shaper.

The invention will be further described in connection with an embodiment thereof, with reference being had to the accompanying drawings, wherein.

Figure 1:
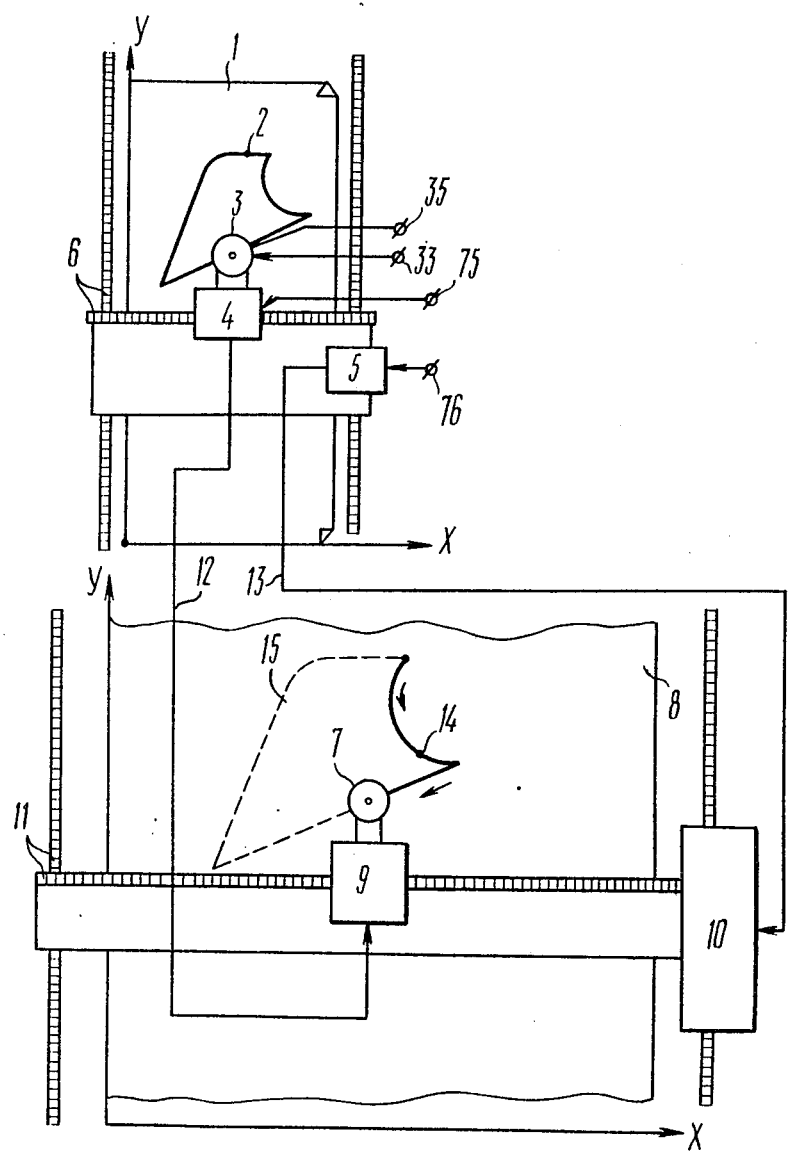
FIG. 1 illustrates schematically the synchronous connection between the tracing head of the phototracing system and the tool of the associated machine.

As illustrated in FIG. 1, the phototracing system for controlling the motion of a tool of a two-coordinate copying machine for pattern-cutting of sheet material includes a template drawing 1 imaged with contours 2 of arbitrary configurations.

The template drawing 1 is made in a rectangular coordinate system with X— and Y—axes.

A tracing photo head 3 is positioned above the plane of the template drawing 1, and is movable in a plane parallel with that of the template drawing 1 in any direction by means of a servodrive 4 and a servodrive 5 which are capable of driving the readout head 3 along guides 6, respectively, in the direction of the X— and X—axes.

The tool 7 of the associated machine (not shown in the drawings) is movable in a plane parallel with that of the surface of the sheet material 8 being cut in any direction by means of a servodrive 9 and a servodrive 10 capable of driving the tool 7 along guides 11, respectively, along the X— and Y—axes of this material 8.

The motion of the servo 4 of the traing head and of the servo 9 of the tool 7 of the machine is synchronized through a synchronizing circuit 12. Similarly, the motion of the servo 5 of the tracing head 3 is synchronized with that of the servo 10 of the tool 7 through a synchronizing circuit 13.

The synchronizing circuits 12 and 13 operate either with signals representative of the linear displacement of the tracing head 3 and of the tool 7, or else they may take form of mechanical linkages, which latter are used in applications wherein the motion of the tool 7 is scaled relative to that of the tracing head 3.

In the herein described embodiment the reproduction scale is 1:1, i.e. the contours 14 of the parts 15 to be cut in the plane of the sheet material 8, the tracing head 3 and the tool 7 move along the same coordinate axes X and Y under the action of the same servodrives along a single pair of coordinate guides.

Figure 2:
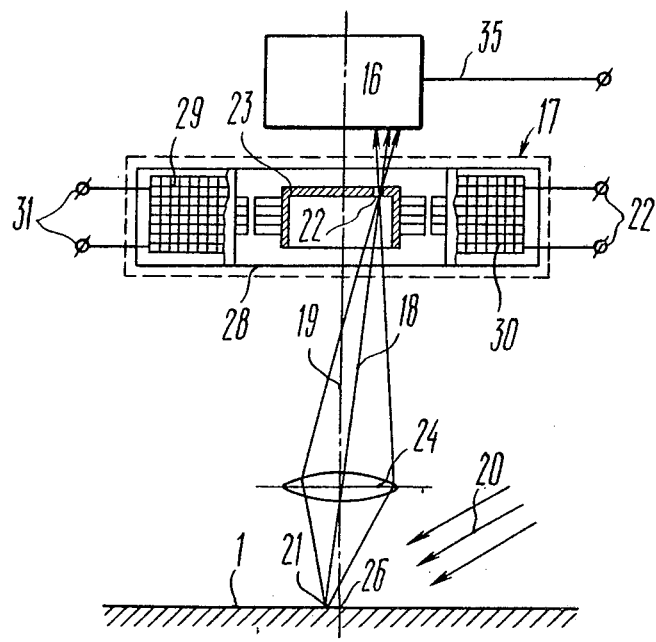
FIG. 2 shows schematically a structural embodiment of the tracing head.

The tracing head 3 includes a photoelectric transducer 16 (FIG. 2) and a unit 17 effecting circular scanning of an optical beam 18 about the optical line 19 of the head 3.

The template drawing 1 is illuminated at the scanning area with a beam 20 of light directed.

The light flux of the optical scanning beam 18 is made up by the light reflected by a spot 21 which forms the aperture or the effective area of the scanning beam in the plane of the template drawing 1.

The area of the aperture 21 of the scanning beam 18 is defined by the area of the eccentric opening 22 of the shutter 23, with provisions for the transformation by the lens 24 of the dimensions of this opening 22 in the plane of the template drawing 1.

Figure 3:
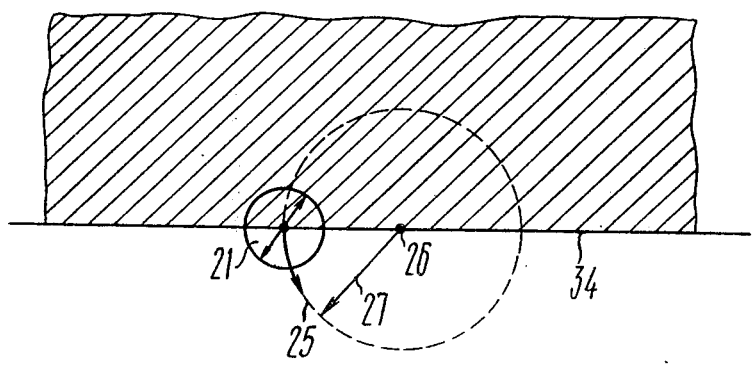
FIG. 3 illustrates the aperture or effective area of the scanning beam, as projected upon the scanning path or orbit.

The area defined by the aperture 21 may be of an arbitrary shape, e.g. circular, as shown in FIG. 3.

The shutter 23 is rotatable about the optical line 19, whereby the aperture 21 of the scanning beam 18 moves permanently along a scanning orbit 25 about the centre 26 of tracing, defined as the point of intersection of the plane of the template drawing 1 by the optical line 19.

The diameter 26 (FIG. 3) of the aperture 21 is commensurate with the radius 27 of the scanning orbit 25.

The angular speed "$\omega$" of the rotation of the shutter 23 (FIG. 2) is constant ($\omega$ = const.). The shutter 23 is rotatable in operation by a synchronous electric motor 28 having a sine winding 29 and a cosine winding 30. However, it should be understood that the motor 28 may be of any other known suitable structure.

The terminals 31 of the winding 29 and the terminals 32 of the winding 30 make up a synchronizing input 33 (FIG. 1) of the tracing head 3.

The contour or outline 2 of the part 15 in the template drawing 1 is defined by one edge 34 (FIG. 3) of a relatively wide line which can be either "black" against the "white" background of the template drawing 1, or else "white" against a "black" background. In the presently described embodiment it is a "black" line against a "white" background.

The photoelectric transducer 16 (FIG. 2) converts the light flux of the optical beam 18 into an electric voltage at the output 35 of the transducer, the light flux reflected from "white" over the area of the aperture 21 yielding across the output 35 a voltage level 36 (FIG. 4) to be hereinafter referred to as the "white" level. Similarly, when the aperture relects the light from "black", we have the "black" level voltage 37 across the output 35.

Figure 4:
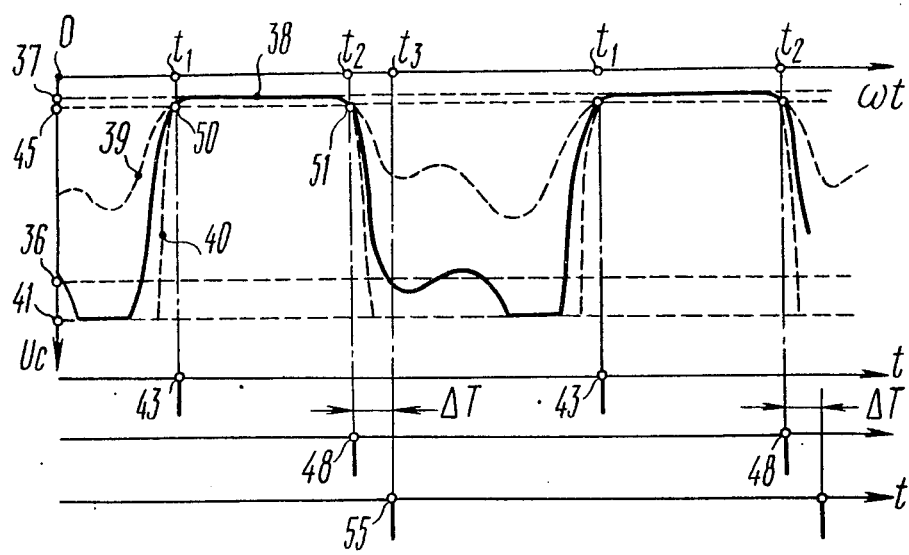
FIG. 4 shows the structure of a readout signal produced by the tracing head and of intermediate signals.

The signal of tracing the edge 34 (FIG. 3), produced by the tracing head 3, is in fact, a cyclic alternation of the "white" and "black" levels with gradual transistions therebetween, which is depicted as a function of the angle "ωτ" of the movement of the aperture 21 along the scanning orbit 24 in a curve 38 in FIG. 4.

As a result of the varying reflecting properties of the template drawing 1, of the unstable degree of illumination by the illuminating beam 20, of the varying response of the photoelectric pickup 16 and of other similar reasons, the "white" level more often than not has an unstable value, either diminishing (the curve 39) or increasing (the curve 40) and sometimes surpassing the threshold level 41 of the photoelectric pickup 16.

Furthermore, the readout curve 38 at the "white" level might be locally distorted by the pollution of the template drawing 1, by the non-uniformity of the zonal characteristics of the tracing head 3, and so on.

Figure 5:
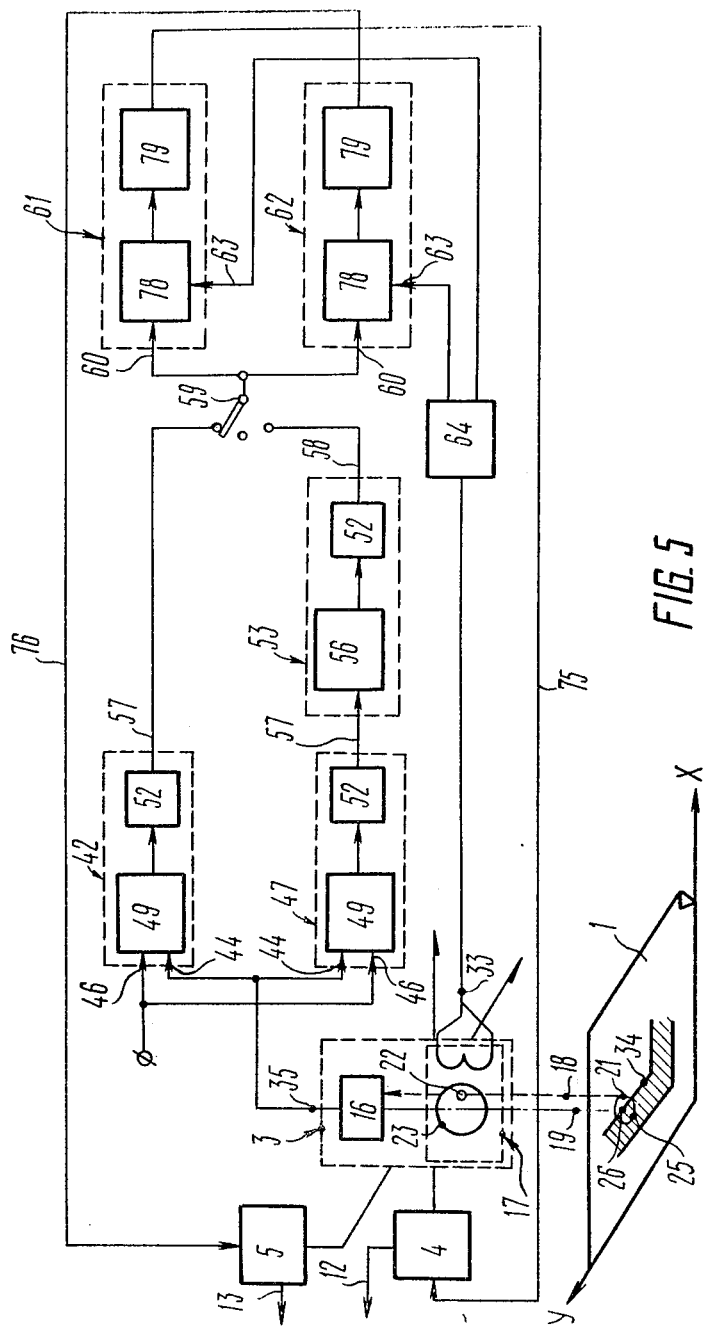
FIG. 5 is a functional block unit diagram of the phototracing system.

The herein disclosed phototracing system further includes a first shaper 42 (FIG. 5) of short pulses 43 (FIG. 4), which represent a signal of prefixed instants of the as if instantaneous change from "white" to "black" in the following signal (curve 38) fed to one input 44 of this shaper 42, as against a present level value 45 fed to another input 46 of the shaper 42.

The phototracing system includes a similar second shaper 47 of short pulses 48 which represent a signal of prefixed instants of the as if instantaneous change from "black" to "white" in the readout signal (curve 38) fed to one input 44 of this shaper 47, as against a preset level value 45 fed to another input 46 thereof.

Both the first and second shapers 42 and 47 include a binary generator 49 generating at the output thereof rapid changes from binary "0" to "1" signals and vice versa, in accordance with the momentary changes of the algebraic sign of the difference between the compared voltages of the permanent or reference level 45 and the readout signal 38 at points 50 and 51 (FIG. 4). The same shapers include their own differential circuits 52 shaping the said short pulses 43 and 48 upon the occurence of changes between the "0" and "1" voltages generated by the binary generator 49.

The output 57 (FIG. 5) of the pulse shaper 47 has connected thereto a delay means 53 for delaying each pulse 48 by the "T" defined by the advance of the greater part of the area of the aperture 21 (FIG. 6) from "black" upon "white" to the same degree which had initiated the generation of the short pulses 43 at the corresponding output 57 of the first shaper 42.

Figure 6:
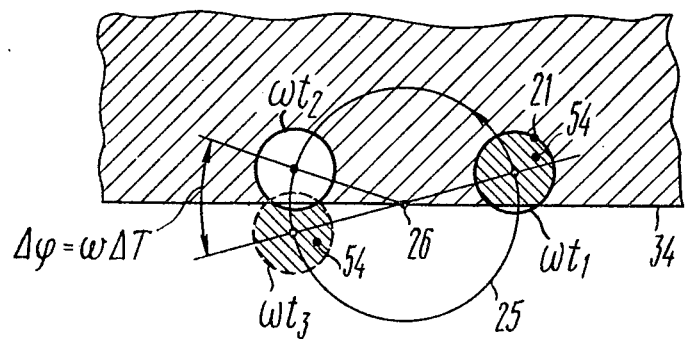
FIG. 6 illustrates the condition of obtaining a signal of the fixed instantaneous change between "black" and "white"

The abovesaid is given an explanation in FIG. 6. The part 54 of the area on "white" at an instant "$t_3$" of the appearance of the delayed pulse 55 should be equal to the same part of the area on "black" at the instant $t_1$ of the appearance of the short pulse 43 which is not delayed.

The delay means 53 (FIG. 5) includes a series connection of a delay member 56, e.g. a delay multivibrator, and the differential circuit 52.

The output 57 of the said pulse shaper 42 and the output 58 of the said delay means 53 are connected through a three-way switch 59 having three conditional positions, viz. "forward", "stop", "reverse", to the input 60 of a converter 61 and to the input 60 of a similar converter 62.

These converters 61 and 62 also have the inputs 63 connected to the outputs of a source 64 of a functional sinusoidal voltage and of a functional cosinusoidal voltage, synchronous and cophasal with the angular speed of the rotation of the shutter 23 of the scanning unit 17, owing to the provision of the connection between the synchronizing input 33 of the tracing head 3 and the said source 64.

Thus, there is fed to the input 60 of the converter 61 the cosinusoidal voltage 65 (FIG. 7), while the sinusoidal voltage 66 is fed to the similar input 63 of the converter 62.

The initial or starting phase of the voltages 65 and 66 relative to the angular position of the aperture 21 in the scanning orbit 24 is made to satisfy the following conditions.

The instantaneous position of the aperture 21 of the scanning beam 18 of the tracing head 3 relative to the positive direction of the half-axis X passing through the tracing centre 25, predetermined for shaping the abovesaid short pulses 43, relative to the edge 34 of the line being traced corresponds to the first zero voltage point 67 of the sinusoidal voltage 66. Similarly, the instantaneous position of the aperture 21 relative to the Y—axis passing through the tracing centre 25 corresponds to the second zero voltage point 68 of the cosinusoidal voltage 65.

The abovesaid instantaneous position of the aperture 21 relative to the edge 34 corresponds to the momentary values 69 and 70 of the said cosinusoidal and sinusoidal voltages 65 and 66, the angle "φ" of the inclination of the edge 34 to the positive direction of the X—axis being quantitatively equal to the angular displacement of the aperture 21 which in this case can be represented with a point 71 (FIG. 7) projected from the X—axis onto the edge 34, i.e. $\phi = \omega t_1$. In the description to follow the point 71 of the established instantaneous position of the aperture 21 relative to the edge 34 of the line being traced will be referred to as the leading point of the scanning orbit.

At the "reverse" position of the three-way switch 59 a short pulse at the output 58 of the delay means 53 corresponds to the aboveconsidered position of the aperture 21 on the edge 34 of the line being traced, but to the other side of the centre 25 of copying, at a point 72. In accordance with this position of the aperture 21, the momentary values 73 and 74 of the cosinusoidal and sinusoidal voltages are quantitatively equal to the momentary voltages 69 and 70, but have the opposite signs. The point 72 will be referred to as the free or trailing point of the scanning orbit. With the tracing being performed in the opposite direction, the point 72 becomes the leading one, whereas the point 71 becomes the free point of the scanning orbit.

The abovementioned converters 61 and 62 produce signals representative of the vectors of the required velocity of the motion of the tracing head 3, respectively, along the X— and Y—axes (FIG. 1), which are transmitted along lines 75 and 76 to prescribe the corresponding mode of the operation of the servos 4 and 5. One of these signals, e.g. the signal at the output of the converter 62, represented by a voltage 77 (FIG. 8) intermediate two instants $t_1$ of the life of the short pulses 48, is maintained at a permanent value equal to the value of the abovementioned momentary voltages 69 or 73. At the output of the converter 61 the signal representative of the required velocity vector, with provisions for the shift of the cosine curve of the voltage fed to the input 63 thereof, has a similar character.

In the presently described embodiment of the invention each one of the converters 61 and 62 (FIG. 5) is in the form of a series connection of a pulse-amplitude element 78 and an amplitude detector 79.

The strobing input of the pulse-amplitude element 78 forms the said input 60 of the respective converters 61 and 62, while the functional input of this element forms the input 63 of these converters.

Figure 9:
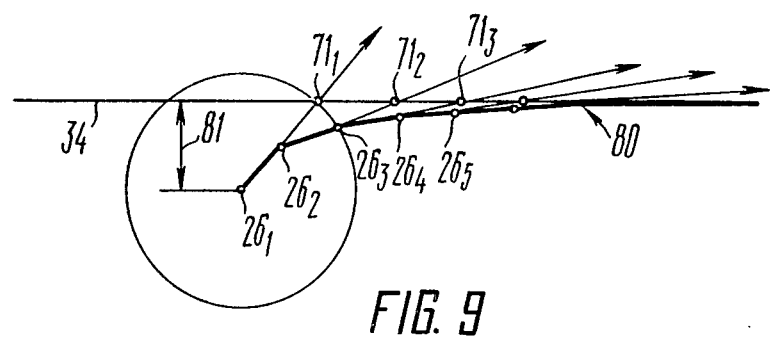
FIG. 9 shows the curve representing the motion of the tracing centre in a transient process of elimination of a tracing error.

The curve 80 (FIG. 9) of the transient process of eliminating the following error 81 is a tractrix.

Figure 10:
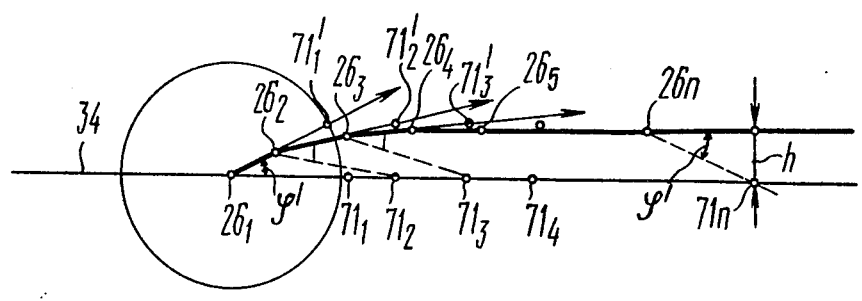
FIG. 10 illustrates a tracing error caused by a phasewise error in determining the leading point of the scanning orbit.

A phasal error $\phi_1$ (FIG. 10) in determining the position of the leading point 71 of the scanning orbit (to which the point 71 corresponds in FIG. 10) results in the copying centre 25 being displaced by the distance "$h$".

The phototracing system for controlling the motion of the work-performing member of a two-coordinate machine for pattern-cutting of shett materials operates, as follows.

The movement of the tracing head 3 (FIG. 1) above the plane of the template drawing 1 along the "X—axis and along the Y—axis, effected by the servos 4 and 5 along the guides 6, is synchronized with the movement of the tool 7 effected by the servos 9 and 10 of the associated machine (not shown in the drawings, as a whole) along guides 11 above the sheet 8 being cut. Therefore, the movement of the tracing head 3 along the line of the contour 2 drawn on the template drawing 1 is accurately reproduced at a preset reproduction scale by the tool 7, whereby the contour 14 of the part 15 being cut out from the sheet material 8 is identical geometrically with the contour 2 of the drawing 1.

The optical scanning beam 18 (FIG. 2) of the tracing head 3 is shaped by the lens 24 and by the opening 22 in the shutter 23. The plane of the template drawing 1 and the opening 22 are positioned in the focal planes of the lens 24, whereby the photoelectric pickup 16 has acting thereupon a light flux reflected by a spot of the plane of the template drawing 1, which is the image of the opening 22 projected upon this plane.

The light flux reflected by other areas of the template drawing 1 is screened out by the shutter 23.

The shutter 23 is continously rotated by the motor 28 about the optical line 19 perpendicular to the plane of the template drawing 1 and intersecting this plane at the point 25 which is the centre of tracing.

One period of the sinusoidal voltage feeding the motor 28 corresponds to one revolution of the shutter 23.

The image of the opening 22 in the plane of the template drawing 1 is the aperture 21 (FIG. 3) of the scanning beam 18. Therefore, the aperture 21 continuously moves along the scanning orbit 24 having a radius 27 about the tracing centre 25.

The angular position of the aperture 21 in the scanning orbit 24 is unambiguously defined by the phase of the voltage feeding the synchronous motor 28 and by the angular position of the synchronous motor 28 (FIG. 2) itself. By rotating the motor 28 about the axis 19, it is possible to vary the phase-wise angular position of the aperture 21 in the scanning orbit 24.

If the optical line or axis 19 of the tracing head 3 intersects the edge 34 (FIG. 3) being traced, i.e. the tracing centre 25 belongs to the said edge, the tracing signal at the output 35 of the photoelectric transducer 16 as a function of the central angle $\omega t$ of rotation of the aperture 21 along the scanning orbit 24 is shaped as the curve 38 (FIG. 4). This position is retained if the switch 59 is in the "stop" state.

The tracing signal which is a cyclic alternation of the "white" level 36 and the "black" level 37, dependent on the angular frequency of the motion of the aperture 21 along the scanning orbit 24, is compared with a preset premanent reference level 45, the level 45 being fed as a permanent D.C. voltage to the input 46 of the binary generator 48 of the pulse shaper 42. A reversal of the sign of the difference between the compared voltages fed to the input 44 of the binary generator 48 (FIG. 5) from the output 35 of the photoelectric pickup 16 and to the input 46 (the latter voltage being the permanent voltage at the level 45) indicates, if the point in question is 50 (FIG. 4), a prefixed instantaneous change from "white" to "black", or, if it is the point 51, a change from "black" to "white". To these instants, $t_1$ and $t_2$ there corresponds a momentary position of the aperture 21 (FIG. 6) relative to the edge 34 of the line being traced, whereat the greater part 55 of the area of the aperture 21 is on the "black". With such selection of the prefixed as if instantaneous change between "black" and "white" the phasal position of the points 50 and 51 in the curve 39 is sufficiently stable when the "white" level in the readout signal varies intermediate the curves 39 and 40 (FIG. 4). The amplitude of the curve 40 may exceed the threshold 41 of the photoelectric transducer 16.

The abrupt changes between "0" and "1" binary signals at the output 49 (FIG. 5) of the binary generator 48, following the momentary reversals of the algebraic sign of the difference in the comparison between the voltage of the curve 38 (FIG. 4) and of the permanent-level voltage 45 at points 50, are transformed by the differential circuit 52 into a train of short pulses 43 representing the signal of the prefixed instantaneous change from "white" to "black".

In a similar manner the shaper 47 (FIG. 5) produces at the output of its own differential circuit 52 short pulses 48 indicating that the aperture 21 of the scanning beam 18 moves onto "white", which trigger the delay multivibrator 56 of the means 53 for delaying each such pulse 48 (FIG. 4). At the instant $t_3$ (FIG. 4) defined by the delay time of the delay multivibrator 56 (FIG. 5), a similar differential circuit 52 in the delay means 53 produces at the output of the latter a train of short pulses 55 (FIG. 4), phase-shifted relative to the pulses 43 through one half of the scanning period. At this instant the momentary position of the aperture 21 (FIG. 6) relative to the edge 34 of the line being traced is such, where the greater part of the area of the aperture has moved onto "white".

The delay time $\Delta T$ is selected so that the aperture 21 moves through the abovementioned angle $\Delta \phi = \omega T$, to occupy the position on "white" corresponding to the angle $\omega t_3$, symmetrical with the position thereof on "black", corresponding to the angle $\omega t_2$.

Therefore, the positions of the aperture 21 relative to the edge 34 of the line being traced at the instants $t_1$ and $t_3$ of the existence of the short-duration pulses 43 and 55 are symmetrical. In the herein described system these positions of the aperture 21 are employed with the help of the pulses 43 and 55 for determining the position of the tracing centre 25 relative to the edge 34, as the latter is being traced in the first and opposite predetermined directions.

The employment of the short pulses 43 and 55 as the signals representing the position of the edge 34 being traced enables to consider (in the description to follow) the scanning beam 18 as an infinitely thin one. The point 71 (FIG. 7) of intersection by this infinitely thin optical beam of the edge 34 forwardly in the tracing direction is the leading point of the scanning robit 24, while the opposite point 72 is the free or trailing point of the scanning orbit 24. The point 71 has the short pulses 43 corresponding thereto, while the pulses 55 correspond to the point 72.

By the angular adjustment of the synchronous motor 28, the initial phase of the angular position of said infinitely thin optical beam is set so that with $\phi = 0$ (FIG. 7) the point 71 coincides with the positive direction of the X—axis at the moment of the initial zero level 67 of the wave 66 of the sinusoidal voltage supplied by the source 64 of the functional sinusoidal and cosinusoidal voltages, synchronous and cophasal with the angular frequency of the movement of the aperture 21 of the optical beam 18 along the scanning orbit 24.

The abovedescribed operation of the system corresponds to the tracing mode having been disabled by setting the three-way switch 59 (FIG. 5) to the midpoint "stop" or "no-tracing" position, whereby the output signals of the converters 61 and 62 equal zero, the servos 4 and 5 (FIG. 1) are stationary, and the tracing centre 25 is stationary, too.

In the tracing mode the herein disclosed phototracing system operates, as follows.

When the train centre 25 belongs to the edge 34 (FIG. 7) being traced, and the switch 59 (FIG. 5) is set to the "forward" position, the point 71 (FIG. 4) becomes the leading point of the scanning orbit 24. Consequently, the velocity vector $V_o$ of the motion of the tracing centre 25 is to be aligned with the edge 34 being traced and directed to the said leading point 71. The coordinate components of the velocity vector $V_o$ are correspondingly equal, as it follows from the drawing of FIG. 7:

$$V_x = V_o \sin \phi; \quad V_y = V_o \sin \phi.$$

On the other hand, the vectors of the momentary voltages 69 and 70 are:

$$U_1 = U_o \cos \omega t_1; \quad U_2 = U_o \sin \omega t_1.$$

On account of $\phi = \omega t_1$, $V_o =$ const. and $U_o =$ const., $$U_{1(69)} \rightarrow V_x; \quad U_{2(70)} \rightarrow V_y.$$

Figure 7:
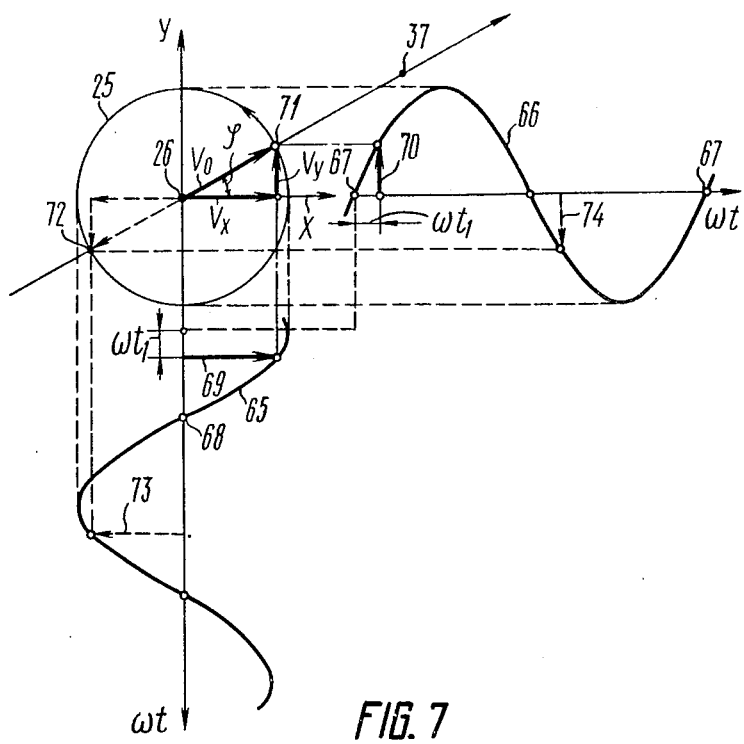
FIG. 7 illustrates the condition of the initial phasing of the functional cosinusoidal and sinusoidal voltages relative to the angular position of the aperture of the optical beam in the scanning orbit.

The above relationships are illustrated in FIG. 7 as the equalities on the following assumption: the vector $V_o$ of the velocity of the motion of the tracing centre 25 is quantitatively equal to the radius 27 of the scanning orbit 24 and also quantitatively equal to the vector $U_o$ of the varying functional cosinusoidal and sinusoidal voltages 65 and 66 (FIG. 7).

The momentary voltages 69 and 70 are detected by the pulseamplitude elements 78 of the converters 61 and 62 by shortduration connection of the cosinusoidal and sinusoidal voltages 65 and 66 to their outputs, during the existence of the shortduration pulse at the inputs 60, coming from the output 57 of the first pulse shaper 42.

Figure 8:
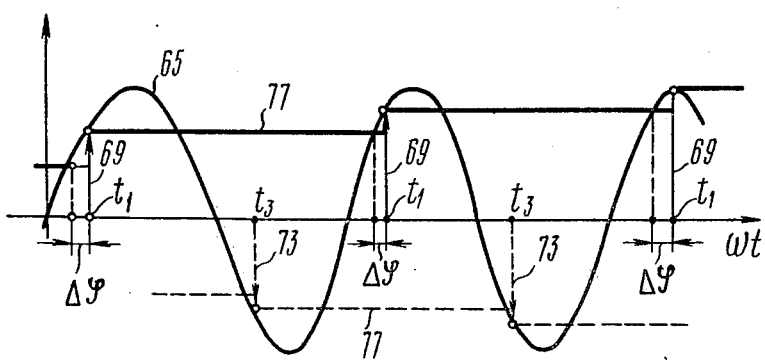
FIG. 8 illustrates the structure of a signal representative of the velocity vectors of the motion of the tracing head along the X— and Y—axes.

The amplitude detectors 79 of the converters 61 and 62 store the values of the momentary voltages 69 and 70 between each pair of successive short-duration pulses fed to the input 60. Therefore, there are supplied along the lines 75 and 76 to the inputs of the servos 4 and 5 (FIG. 5, FIG. 3) signals 77 proportional to the required velocities of the motion of the tracing head 3. Over the scanning period the signals 77 are maintained at a permanent value, as it is shown in FIG. 8.

Consequently, the tracing centre 25 of the head 3 moves toward the leading point 71 of the scanning orbit 24 along the tracing line 37.

When the switch 59 is set to the "reverse" position, the point 72 (FIG. 7) of the scanning orbit 24 becomes the leading one, whereas the point 71 becomes the free or trailing one, because in this case there are fed to the inputs 60 of the converters the pulses 55 (FIG. 4) coming from the output 58 of the delay means 53.

Now the other momentary voltages 73 and 74 equal in value to the voltages 69 and 70, but opposite by their sign, determine at the outputs of the converters 61 and 62 the signals representative of the coordinate components of the velocity vector $V_o$, although with the opposite signs, whereby the tracing centre moves toward the now-leading point 72 of the scanning orbit 24, which means that the tracing is performed in the opposite direction.

If for some reason the tracing centre 25 (FIG. 9) becomes displaced from the edge 34 being traced, the phototracing system acts to reduce the following error 81 to zero. At the first successive scanning period the leading point 71 of the scanning orbit 24 determines the direction of the motion, as it has been already described.

Thus, the tracing centre 25 moves toward the point $71_1$, until a point $71_2$ is evolved, whereby the directions of the motion becomes oriented toward this last-mentioned point, and so on. Therefore, the elimination of the following error is effected in general along a tractrix 80.

In a steady operating mode the phototracing system advances the tracing centre 25 precisely along the edge 34 being traced.

A non-stability of the phase-wise relationship between the abovementioned points 50 and 51 (FIG. 4) and the fixed position of the aperture 21 (FIG. 6) of the instantaneous change from "white" to "black" in accordance with the position $\omega t_1$ and from "white" to "black" in accordance with the position $\omega t_2$ brings about an error "h" in tracing the edge 34 of the line being followed.

When the tracing centre 25 (FIG. 10) belongs to the edge 34 being traced, and there appears an angular error $\phi'$ in determining the point $71_1$, the tracing centre 25 will move toward a point $71_1'$ until it reaches a path equidistant with the edge 34 at a point $25_{h1}$, where the equidistant error $h = R \sin \phi$, and R is the radius 27 of the scanning orbit 24.

Owing to the selection of the level 45 (FIG. 4) in accordance with the advance of the greater part 55 of the area of the aperture 21 of the scanning beam 18 upon "black", with the subsequent equivalent equalization of the phase-wise position of the aperture at advancing from "black" to "white" with the help of the means 53 delaying each pulse 48 representing the advance of the aperture 21 upon "white", with the corresponding setting of the initial phase of the functional cosinusoidal and sinusoidal voltages, there is attained the utmost stability of the signals representing the fixed positions of the aperture 21 relative to the edge being traced and, an improved accuracy of the tracing process and an improved precision of the dimensions of the parts cut out from a sheet material.

What we claim is:

1. A phototracing system for controlling the motion of the tool of a two-coordinate machine for cutting sheet materials, comprising:

a template drawing having imaged thereon in a rectangular system of coordinates X and Y the contours of parts of arbitrary configurations, which are to be cut by said machine from a sheet material;

the contours of the parts being shown on said template drawing as a wide contrast line, one "black-to-white" edge of said wide contrast line being the outline of the contours of the parts of arbitrary configurations, to be cut from the sheet material, on said template drawing;

a tracing head having an optical axis indexed substantialy normally with respect to the plane of said template drawing;

the tracing centre of said tracing head, defined as the point of intersection by the optical axis of said tracing head of the plane of said template drawing, adapted to follow said one "black-to-white" edge of the wide line of said template drawing in a given direction; an optical tracing beam by means of which said tracing head cooperates with said template drawing;

the aperture defined by said tracing beam in the plane of said template drawing having a concentrated area of definite dimensions and determining the value of the light flux of said tracing beam;

a unit for effecting a scanning motion of said optical tracing beam of said tracing head, having a synchronizing input;

a scanning orbit defined in the plane of said template drawing, along which said aperture is adapted to be moved at a permanent speed, being a circle having for its centre said tracing centre with said tracing head being stationary;

a photoelectric transducer of said tracing head, adapted to convert the light flux of said optical tracing beam into an electric voltage at the output thereof, the value of this voltage serving as a "black" and "white" signal;

the "black" level serving as a zero point at evaluation of the voltage level at the output of said photoelectric transducer;

a signal of tracing the "black-to-white" edge of the wide line, generated at the output of said tracing head, being a cyclic alternation of said "black" and "white" levels at an angular frequency "ω" corresponding to the rotation of said aperture;

the curve representing said tracing signal having gradual increases and recesses, caused by the continuous transition of said aperture through said "black-to-white" edge from "white" to "black" and vice versa;

a first shaper of a short-duration pulse of a signal of a fixed as if instantaneous change from "white" to "black" in said tracing signal, having a first input, a second input and an output;

a second shaper of a short-duration pulse of a signal of a fixed as if instantaneous change from "black" to "white" in said tracing signal, having a first input, a second input and an output;

said first inputs, respectively, of said first and second shapers being connected with the output of said photoelectric transducer;

the fixed instant of changing from "white" to "black" being predetermined by the condition of the advance of the greater part of the area of said aperture onto "black", and the fixed instant of changing from "black" to "white" being predetermined by the condition of the advance of the smaller part of the area of said aperture upon "white";

a permanent level of voltage being preset for determining said fixed instants of the changes from "white" to "black" and vice versa by comparison thereof with the level of said tracing signal;

said permanent level of voltage being preset to be less than half of the "white" level of said tracing signal and being fed to said second respective inputs of said first and second shapers;

a comparator in each said first and second shaper, adapted to determine the algebraic sign of the difference between the compared levels of said tracing signal and said permanent preset level;

a differential circuit in each said first and second shaper, connected in series with said respective comparator to shape short-duration pulses from changes between "1" and "0" signals of said comparator, in accordance with instantaneous changes of the algebraic sign of the difference between the compared levels of said tracing signal and said permanent preset voltage level;

means for delaying each said short pulse produced by said second shaper by the time of the advance of the greater part of said aperture from "black" to "white" to the same degree as that which had initiated the production of said short pulse at the output of said first shaper at the preceding advance of said aperture from "white" upon "black";

a source of a functional cosinusoidal voltage and of a functional sinusoidal voltage, synchronous and cophasal with the angular frequency "ω" of the rotation of said aperture about said tracing centre, having two outputs, the initial phase of said sinusoidal voltage being set by the coincidence in time of the first zero levels of its sine wave with said short pulses at the output of said first shaper, under a condition that the edge of the wide line passes through said tracing centre, parallel with the X—axis of said template drawing;

a three-way switch means for three states conditionally corresponding to the three tracing modes "forward-stop-reverse";

the inputs of said first and second shapers being connected with the output of said photoelectric transducer, the output of said first shaper being connected with one "forward (reverse)" input of said three-way switch, and the output of said second shaper being serially connected through said delay means with the other "reverse (forward)" input of said three-way switch;

a first converter having a first input, a second input and an output;

a second converter similar to said first converter, having a first input, a second input and an output;

said first inputs of said first and second converters being connected with the output of said three-way shitch;

said second input of said first converter being connected to the cosinusoidal voltage output of said source of functional voltages and said second input of said second converter being connected to the sinusoidal voltage output of said source;

said first converter being adapted to convert the short pulse coming from the output of said three-way switch and the cosinusoidal voltage of said source of functional voltages into a signal representing the velocity vector of the motion of said tracing head along the X—axis, and said second converter being adapted in a similar manner to produce, with provisions for the sinusoidal voltage of said source, a similar signal with respect to the Y—axis;

the cosinusoidal and sinusoidal voltages of said source being supplied to said synchronizing input of said tracing head;

a pulse-amplitude element in each said first and second converter, having a strobing input and a functional input, the former one of said inputs forming said first input, respectively, of said first and second converters and said functional input forming said second input, respectively, of said first and second converters;

said pulse-amplitude element being adapted to produce short-duration pulses of which the amplitudes equal the instantaneous values of the voltage supplied to said functional input, in correspondence with the moments of existence of the short-duration pulses fed to said strobing input thereof;

an amplitude detector in each said first and second converter, connected with the output of the respective said pulse-amplitude element, adapted to produce at the output thereof a signal shaped as an envelope of the output signals of said element, said envelope being the signal representing the velocity vector of the motion of said tracing head along the respective coordinate axis;

a first servodrive having the input thereof connected to the output of said amplitude detector in said first converter, adapted to displace said tracing head along the X—axis of said template drawing;

a second servodrive having the input thereof connected to the output of said amplitude detector in said second converter, adapted to displace said tracing head along the Y-axis of said template drawing.

* * * * *